United States Patent [19]
Yonezawa

[11] Patent Number: 5,427,218
[45] Date of Patent: Jun. 27, 1995

[54] CONVEYING ROLLER

[75] Inventor: Keitaro Yonezawa, Kobe, Japan

[73] Assignee: Kabushiki Kaisha Kosmek, Kobe, Japan

[21] Appl. No.: 136,264

[22] Filed: Oct. 15, 1993

[30] Foreign Application Priority Data

Oct. 16, 1992 [JP] Japan .................. 4-304605

[51] Int. Cl.6 .................. B65G 13/00
[52] U.S. Cl. .................. 193/37; 193/35 R
[58] Field of Search ............ 193/35 R, 37; 198/780

[56] References Cited

U.S. PATENT DOCUMENTS

| 2,717,071 | 9/1955 | Cook | 193/35 R X |
|---|---|---|---|
| 2,730,222 | 1/1956 | Klein | 193/37 |
| 3,269,502 | 8/1966 | Kornylak | 193/37 |
| 3,353,644 | 11/1967 | McNash et al. | 193/37 |
| 3,455,472 | 7/1969 | Rankin, Jr. | 193/35 R X |
| 4,415,074 | 11/1983 | Leinenger | 193/37 X |
| 4,449,907 | 5/1984 | Yonezawa et al. | |
| 4,597,709 | 7/1986 | Yonezawa . | |
| 5,063,648 | 11/1991 | Yonezawa et al. | |
| 5,072,819 | 12/1991 | Yonezawa et al. | |

FOREIGN PATENT DOCUMENTS 59-140821 9/1984 Japan .

Primary Examiner—James R. Bidwell
Attorney, Agent, or Firm—Bacon & Thomas

[57] ABSTRACT

In a movable plate (1) of an injection moulding machine, there are arranged a threaded hole (29) and a supporting hole (28) in series in the substantially horizontal direction. A supporting portion (22) of a support cylinder (12) is fitted into the supporting hole (28), and a roller member (14) is externally rotatably fitted to a bearing portion (23) of the support cylinder (12). An annular flange portion (25) is provided between the supporting portion (22) and the bearing portion (23). An outer diameter (D) of the flange portion (25) is so set as to be larger than an inner diameter (A) of the supporting hole (28) and to be smaller than an outer diameter (B) of the roller member (14). The bolt (16) is screwed into the threaded hole (29) so as to press the flange portion (25) onto the movable wall (1) through the support cylinder (12).

4 Claims, 4 Drawing Sheets

CONVEYING ROLLER

BACKGROUND OF THE INVENTION

1. Field of the Invention

The present invention relates to a roller adapted to convey a metal mould of an injection moulding machine and the like in the horizontal direction.

2. Description of the Prior Art

Among such conveying rollers, conventionally there are ones disclosed in Japanese Utility Model Publication No. 59-140821. This conventional conveying roller is constructed as follows as shown in FIG. 5.

A threaded hole 79 and a supporting hole 78 are formed in a fixed plate 51 of an injection moulding machine so as to be arranged in series in the substantially horizontal direction. A supporting portion 72 of a support cylinder 62 is fitted into the supporting hole 78. A bearing portion 73 of the support cylinder 62 externally supports a roller member 64 rotatably through a bearing 63. A bolt 66 inserted into a cylindrical bore 65 of the support cylinder 62 is threadably engaged with the threaded hole 79 so as to press and secure the supporting portion 72 of the support cylinder 62 onto the fixed plate 5I by means of the bolt 66.

Incidentally, an axis of the bearing portion 73 is offset relative to an axis of the supporting portion 72 so as to enable an adjustment of a height position of the roller member 64.

A metal mould weight W acting on the roller member 64 during conveying of a metal mould 55 is received by a vertical resistive force V provided by a peripheral surface of the supporting hole 78. When a horizontal reaction force H acts from the fixed plate 51 to an end surface of the supporting portion 72 so as to cope with a moment (W×L) produced by the metal mould 55, the horizontal reaction force H is received by a tightening force F of the bolt 66. An allowable conveying load of the conveying roller 60 is so set that a value of the horizontal reaction force H becomes smaller than a maximum tightening force of the bolt 66.

In the conventional embodiment, since an arm length r of the horizontal reaction force H is small, the value of the horizontal reaction force H becomes much larger than the metal mould weight W. Therefore, the allowable conveying load of the conveying roller 60 is limited to a small value.

In order to solve the above-mentioned problem, it can be supposed that a diameter of the supporting portion 72 should be increased so as to enlongate the arm length r. In this case, however, since it becomes necessary to increase also a diameter of the supporting hole 78, it becomes difficult to drill the supporting hole 78 in an installation spot of the injection moulding machine. Therefore, it is troublesome to mount the conveying roller.

SUMMARY OF THE INVENTION

It is an object of the present invention to increase an allowable conveying load of a conveying roller and to facilitate a mounting of the conveying roller.

For accomplishing the above-mentioned object, for example as shown in FIGS. 1(a) and 1(b), a conveying roller is constructed as follows.

A threaded hole 29 and a supporting hole 28 are formed in a vertical wall 1 so as to be arranged in series in the substantially horizontal direction. A supporting portion 22 of a support cylinder 12 is fitted into the supporting hole 28, and a roller member 14 is supported by a bearing portion 23 of the support cylinder 12. A clearance C is provided between a bottom wall 28a of the supporting hole 28 and the supporting portion 22. An annular flange portion 25 facing the vertical wall 1 is provided between the supporting portion 22 and the bearing portion 23. An outer diameter D of the flange portion 25 is set larger than an inner diameter A of the supporting hole 28. A bolt 16 inserted into a bore 15 of the support cylinder 12 is screwed into the threaded hole 29 so that the support cylinder 12 and the flange portion 25 are pressed onto the vertical wall 1 by means of a tightening force of the bolt 16.

For example as shown in a schematic view of FIG. 1(b), the present invention functions as follows.

A metal mould weight W acting on the conveying roller 10 is received by a vertical resistive force V provided by the supporting hole 28. A horizontal reaction force H acts from the vertical wall 1 to an outer edge portion of the annular flange portion 25 so as to cope with a moment (W×L) produced by the metal mould weight W, and this horizontal reaction force H is received by the tightening force F of the bolt 16.

As mentioned above, since the horizontal reaction force H acts on the outer edge portion of the annular flange portion 25 having a larger diameter than that of the supporting hole 28, the arm length R becomes larger so as to decrease the value of the horizontal reaction force H. Incidentally, in the illustrated example, since the arm length R becomes about two times as long as the arm length r based on such an assumption that the horizontal reaction force H is imposed to the supporting portion 22, the value of the horizontal reaction force H becomes about half.

Since the present invention is constructed and functions as mentioned above, the following advantages can be obtained.

Since the value of the horizontal reaction force becomes decreased, the tightening force of the bolt becomes sufficient so that the allowable conveying load of the conveying roller can be increased correspondingly.

Further, since it is not necessary to enlarge the inner diameter of the supporting hole to be formed in the vertical wall, the drilling is facilitated in an installation spot of a facility such as the injection moulding machine. Since it is enough to support the supporting portion of the support cylinder by the supporting hole from below and it is not necessary to deepen the supporting hole while also a high accurate finishing is not required for the supporting hole, the hole drilling is further facilitated.

Accordingly, an increasing of the allowable conveying load and a facilitating of the mounting are compatible in the conveying roller.

BRIEF DESCRIPTION OF THE DRAWINGS

The above and other objects, advantages and features of the invention will become apparent when considered with the following detailed description and accompanying drawings wherein:

FIG. 1 (a) is a vertical sectional view of a conveying roller;

FIG. 1(b) is a schematic view of the conveying roller;

FIG. 2 is a front view of a movable plate for an injection moulding machine provided with the conveying roller;

DESCRIPTION OF THE PREFERRED EMBODIMENTS

Figure 1A:
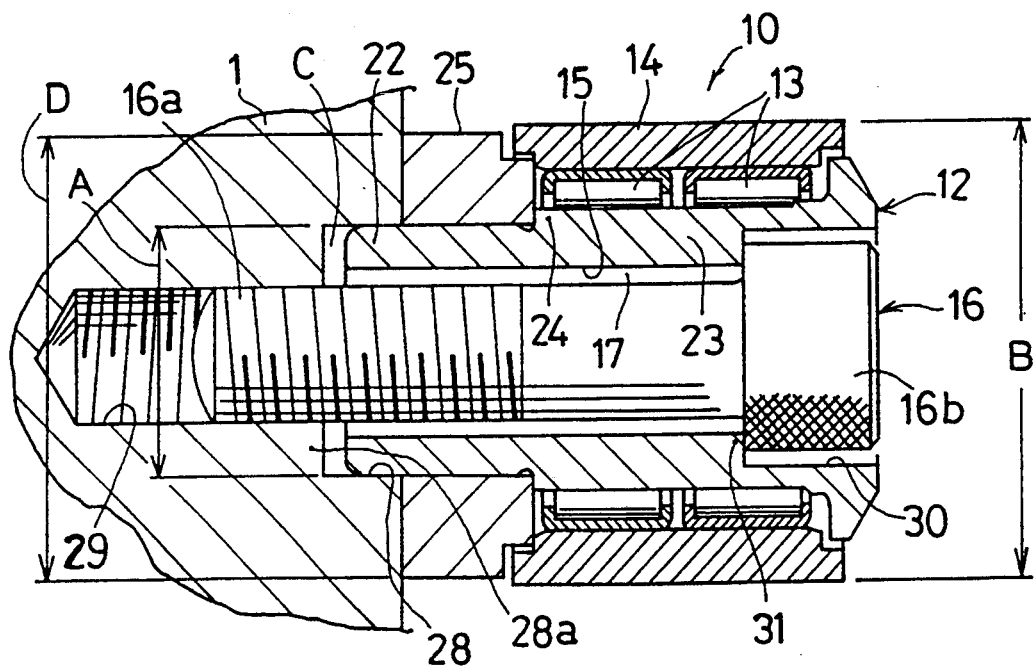
FIGS. 1(a), 1(b) and 2 show one embodiment of tile present invention.
Figure 1B:
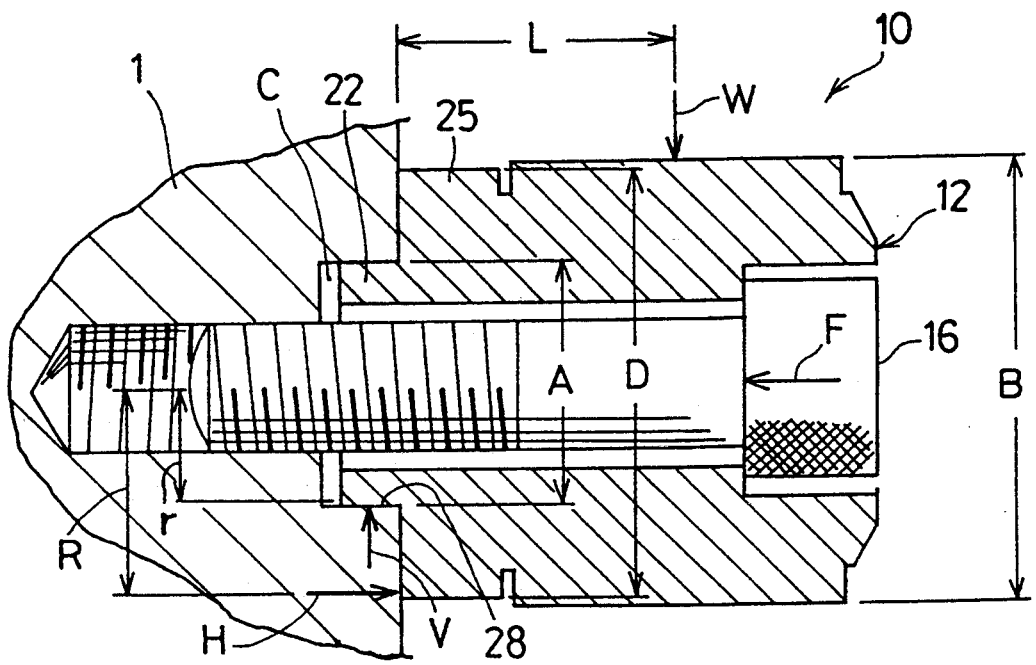
Figure 2:
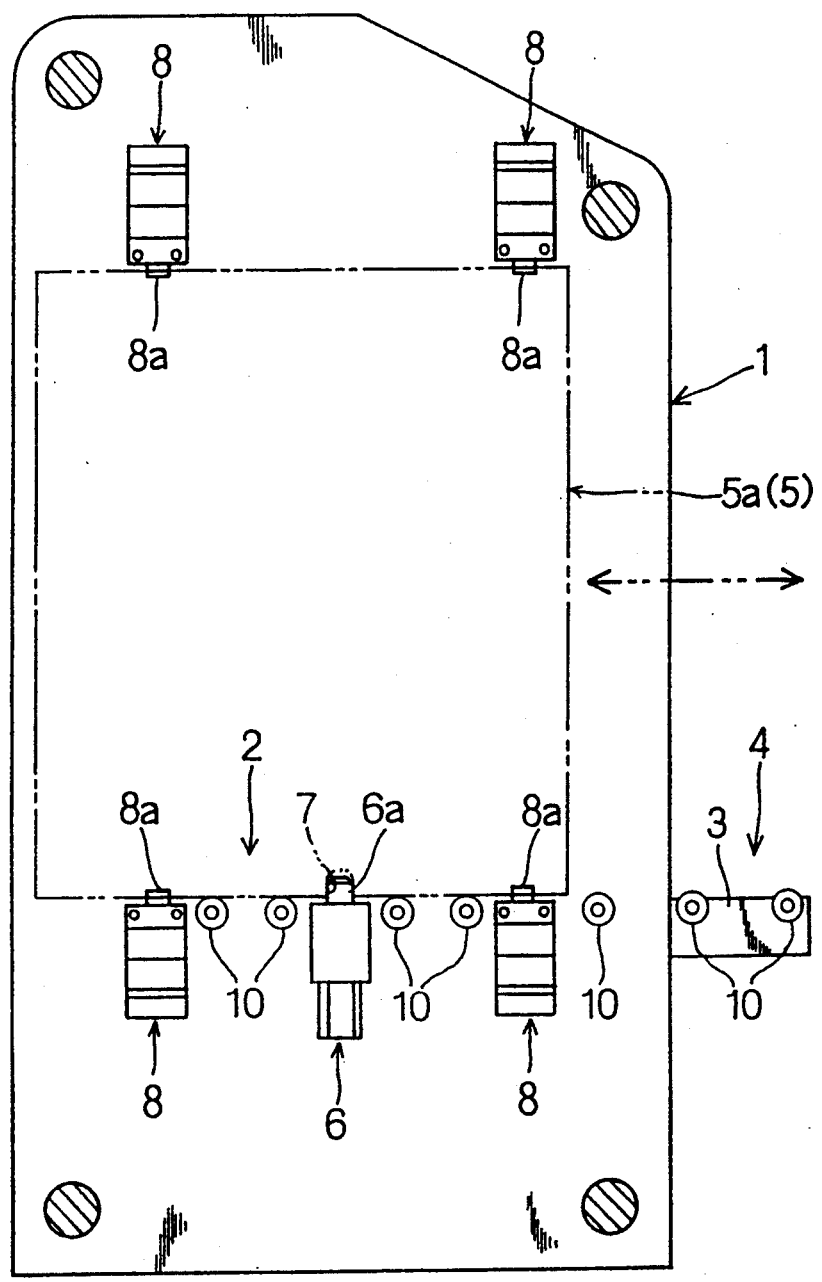

FIGS. 1 and 2 show one embodiment of the present invention. Firstly, a general construction thereof will be explained with reference to FIG. 2.

The symbol 1 designates a movable plate of a horizontal injection moulding machine. A first roller conveyer 2 is mounted to each lower portion of the movable plate 1 and a fixed plate (not illustrated). A second roller conveyer 4 is mounted to brackets 3 projecting rightwards from these movable plate 1 and fixed plate respectively.

After a metal mould 5 is moved to a space on the right side of the injection moulding machine, it is conveyed to a location between the movable plate 1 and the fixed plate through the second roller conveyer 4 and the first roller conveyor 2 in order. The conveyed metal mould 5 is positioned by fitting a rod 6a of a positioning cylinder 6 into a groove 7 of a movable mould part 5a. After that, the movable mould part 5a is pressed and secured onto the movable plate 1 by means of clamping members 8a of four fluid pressure clamps 8 and also a fixed mould part (not illustrated) is pressed and fixed onto the fixed plate.

The first roller conveyer 2 comprises five conveying rollers 10 arranged with a predetermined interval in the substantially horizontal direction along the movable plate 1 as a vertical wall. Also the second roller conveyer 4 comprises the two similar conveying rollers 10 with a predetermined interval in the substantially horizontal direction along the bracket 3 as the vertical wall.

Incidentally, also the fixed plate is provided with the two roller conveyers similarly to the above. As shown in FIG. 1 (a), the movable plate 1 is provided with a threaded hole 29 and a supporting hole 28 which are coaxially arranged in series so as to extend in the substantially horizontal direction. The conveying roller comprises a support cylinder 12, two bearings 13 and a roller member 14 arranged radially coaxially in order from inside and a bolt 16 inserted into a cylindrical bore 15 of the support cylinder 12 through a predetermined annular clearance 17.

A supporting portion 22 of the support cylinder 12 is fitted into the supporting hole 28. There is provided a clearance C between a bottom wall 28a of the supporting hole 28 and the supporting portion 22. The roller member 14 is externally rotatably mounted to a bearing portion 23 of the support cylinder 12 through the bearings 13, 13. This bearing portion 23 is so formed as to have a larger diameter than that of the supporting portion 22.

An annular flange portion 25 facing the vertical wall 1 is provided between the supporting portion 22 and the bearing portion 23. An outer diameter D of the flange portion 25 is so set as to be larger than an inner diameter A of the supporting hole 28 and to be smaller than an outer diameter B of the roller member 14. Therefore, the flange portion 25 can be prevented from projecting from a top portion of the roller member 14, so that the flange portion 25 doesn't hinder the conveying of the metal mould 5.

A threaded leg portion 16a of the bolt 16 is screwed into a threaded hole 29 of the movable plate 1, so that a head portion 16b of the bolt 16 presses the support cylinder onto the movable plate 1. Thereupon, a tightening force of the bolt 16 presses the annular flange portion 25 onto the movable plate 1 through a shoulder portion 24 of the bearing portion 23.

Incidentally, the bolt head portion 16b is accommodated in a concaved portion 30 of the support cylinder 12 so as to press a bottom wall 31 of the concaved portion 30.

As schematically shown in FIG. 1(b), the metal mould weight W acting from the roller member 14 to the support cylinder 12 during conveying of the metal mould 5 is received by a vertcal resistive force V provided by a peripheral surface of the supporting hole 28.

Further, a horizontal reaction force H acts from the movable plate 1 to an outer edge portion of the annular flange portion 25 so as to cope with a moment (W×L) produced by the metal mould weight W. This horizontal reaction force H is received by a tightening force F of the bolt 16. Therefore, a bending moment is hardly imposed to the bolt 16.

Figure 3:
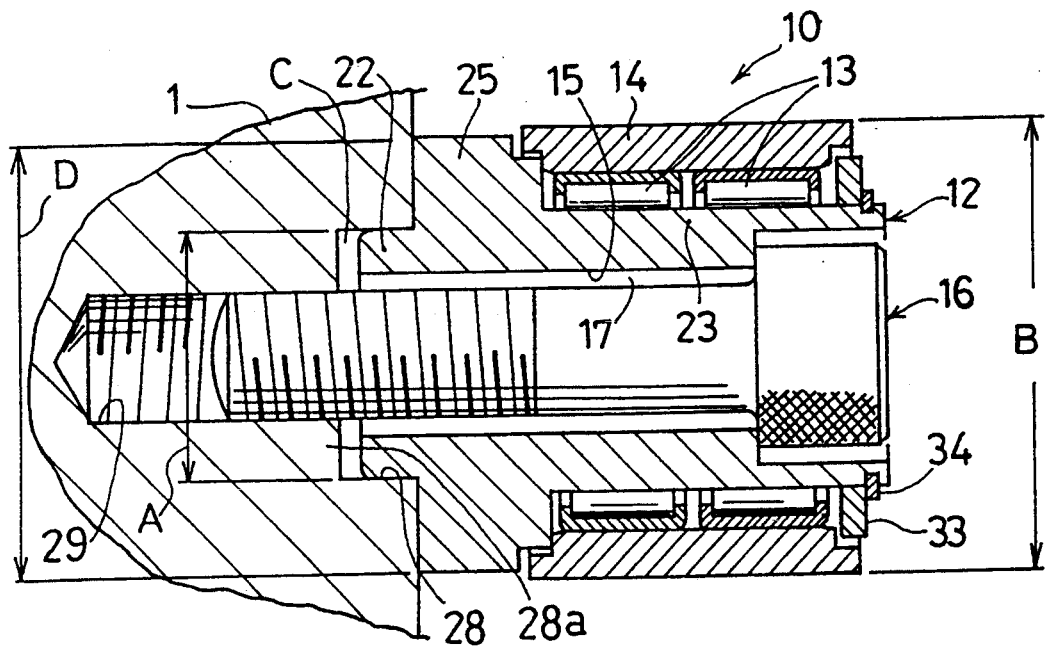
FIG. 3 shows a first variant example of the conveying roller and is a view corresponding to FIG. 1 (a)
Figure 4:
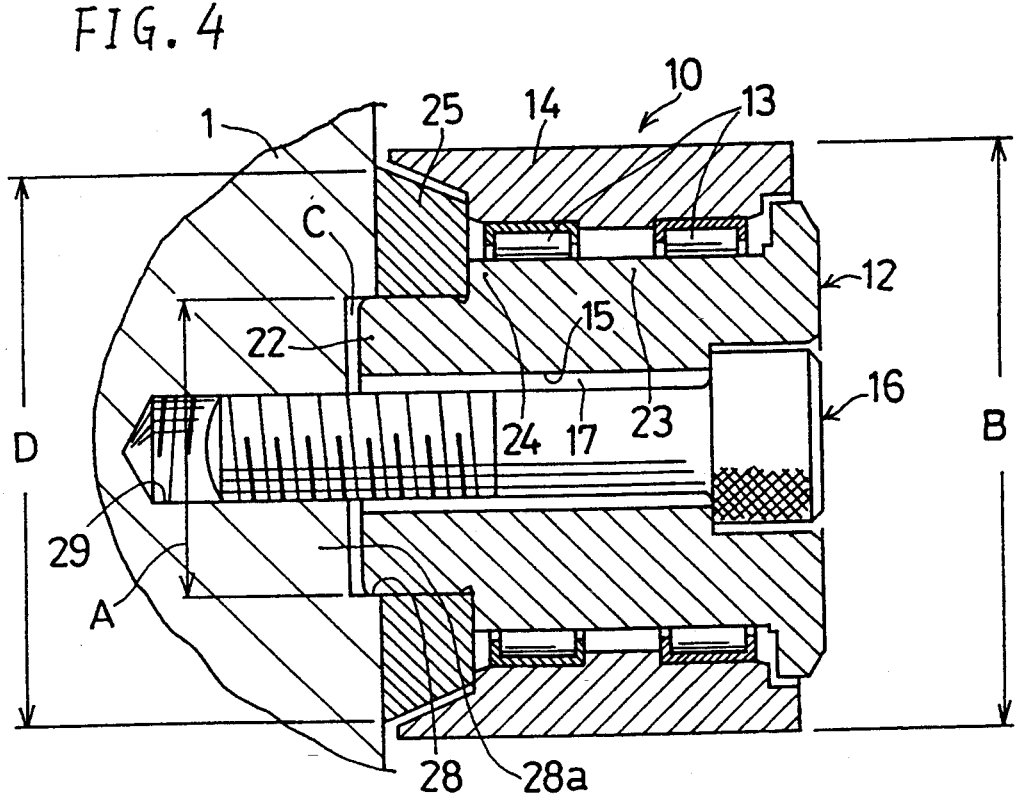
FIG. 4 shows a second variant example of the conveying roller and is a view corresponding to FIG. 1 (a)
Figure 5:
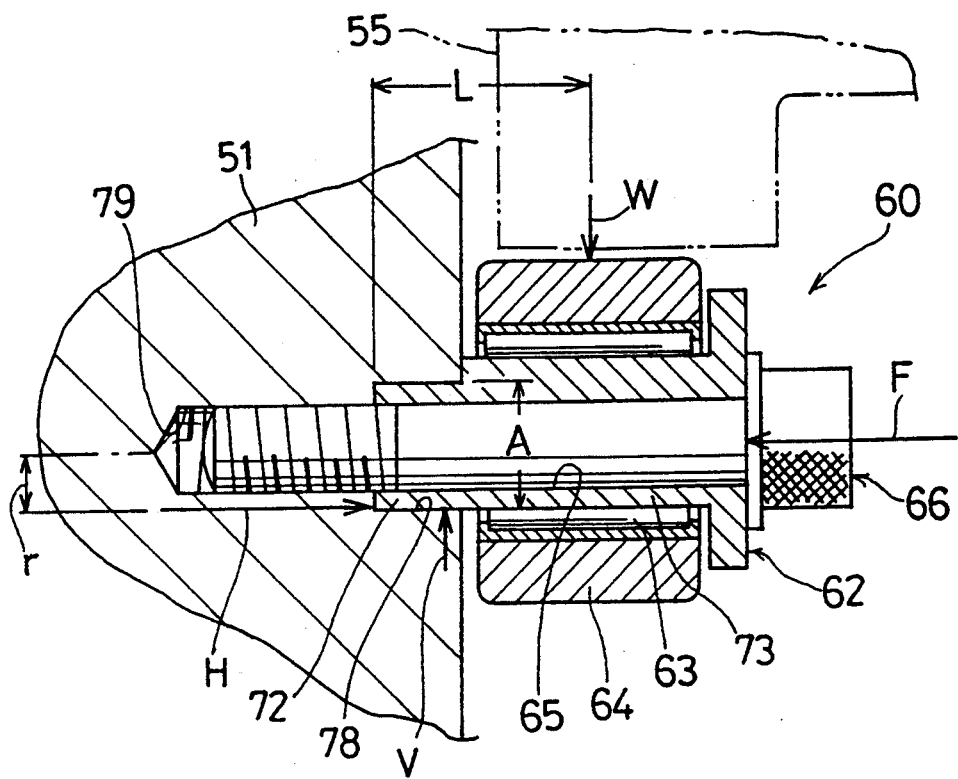
FIG. 5 shows a conventional embodiment and is a view corresponding to FIG. 1 (a).

FIGS. 3 and 4 show variant examples respectively, in which component members having the same constructions as those in the above-mentioned embodiment are designated by the same symbols.

In a first variant example shown in FIG. 3, the annular flange portion 25 is formed integrally with the support cylinder 12, and a ring 33 for preventing a pull-out and a snap ring 34 are provided in the right end portion of the support cylinder 12.

In a second variant example shown in FIG. 4, the supporting hole 28 is formed shallowly in the movable plate 1, and the annular flange portion 25 is formed in a truncated cone configuration and has the large outer diameter D.

Incidentally, in order to realize a compact construction of the conveying roller 10, as mentioned above, it is preferable to accommodate the head portion 16b of the bolt 16 in the concaved portion 30 of the cylindrical bore 15. But the concaved portion 30 may be omitted.

Further, in the above-mentioned embodiment and the variant examples, the outer diameter D of the annular flange portion 25 may be at least equal to the outer diameter B of the roller member 14.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A conveying roller being adapted to be mounted to a vertical wall (1) having a threaded hole (29), a supporting hole (28) and a peripheral wall portion all arranged in series in a substantially horizontal direction, the supporting hole (28) having a bottom wall (28a), said conveying roller comprising;

a support cylinder (12) having a bore (15) and provided with a supporting portion (22) extending into the supporting hole (28) and a bearing portion (23) supporting a roller member (14);

a clearance (C) provided between the bottom wall (28a) of the supporting hole (28) and the supporting portion (22);

an annular flange portion (25) provided about a predetermined section of the supporting portion (22), between the bearing portion (23) and the peripheral wall portion; and a bolt (16) adapted to be inserted into the bore (15) and to be screwed into the threaded hole (29) so that the flange portion (25) is pressed against the peripheral wall portion through the support cylinder (12) by a tightening force of the bolt (16).

2. A conveying roller as set forth in claim 1, wherein the outer diameter (D) of the flange portion (25) is so set as to be smaller than an outer diameter (B) of the roller member (14).

3. A conveying roller as set forth in claim 1, wherein a concaved portion (30) for accommodating a head portion (16b) of the bolt (16) is formed in the bore (15) of the support cylinder (12).

4. A conveying roller as set forth in claim 1, wherein the bearing portion (23) is so formed as to have a larger diameter than that of the supporting portion (22), and a shoulder portion (24) is provided between both these portions (23)(22) so as to be received by the flange portion (25).

* * * * *